L. R. McDANIEL.
ATTACHMENT FOR BINDERS, HARVESTERS, AND THE LIKE.
APPLICATION FILED OCT. 6, 1915.
1,181,094.
Patented Apr. 25, 1916.
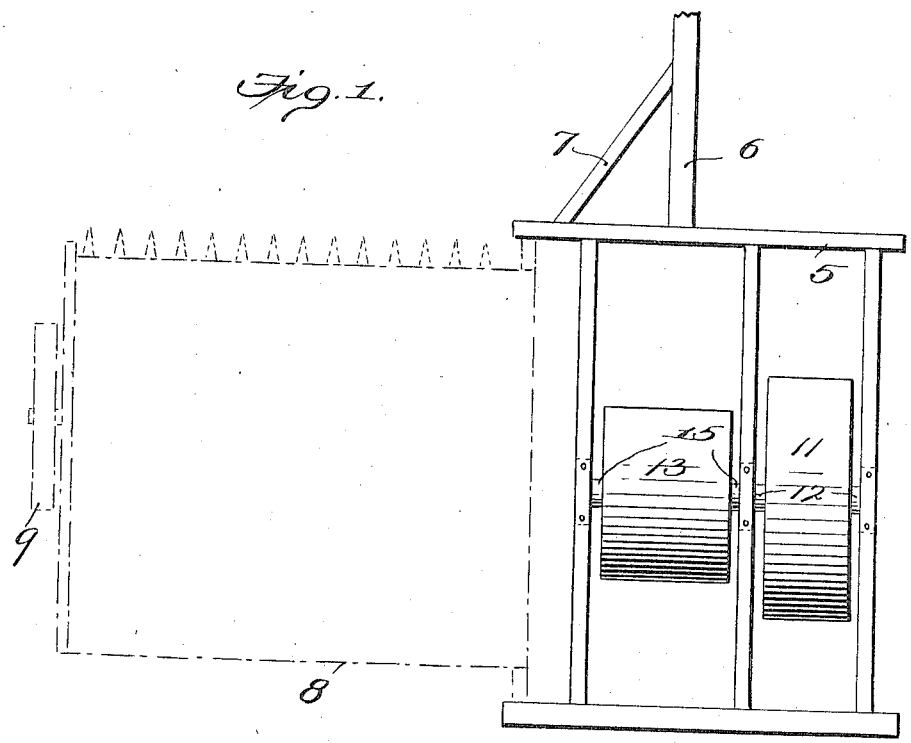
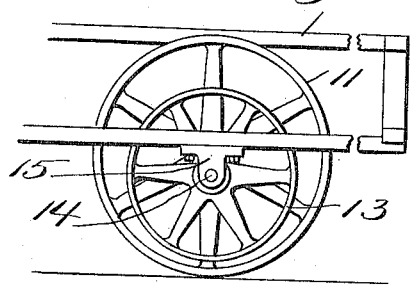
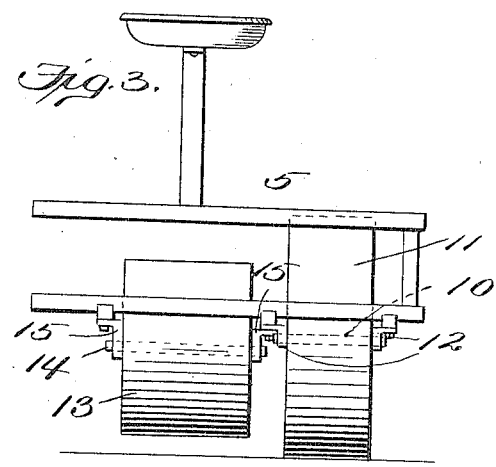
Inventor
Luther R. McDaniel

UNITED STATES PATENT OFFICE.

LUTHER R. McDANIEL, OF HUNTSVILLE, MISSOURI, ASSIGNOR OF ONE-HALF TO F. H. HAMMETT, OF CONWAY, ARKANSAS.

ATTACHMENT FOR BINDERS, HARVESTERS, AND THE LIKE.

1,181,094. Specification of Letters Patent. Patented Apr. 25, 1916.

Application filed October 6, 1915. Serial No. 54,445.

*To all whom it may concern:*

Be it known that I, LUTHER R. McDANIEL, a citizen of the United States, residing at Huntsville, in the county of Randolph and State of Missouri, have invented new and useful Improvements in Attachments for Binders, Harvesters, and the Like, of which the following is a specification.

This invention relates to an attachment for binders, corn harvesters and other analogous machinery, and the primary object of the same is to provide an attachment that will permit a binder, harvester or other machine to travel or more over soft or muddy ground and operate as effectively as when moving over a hard ground surface by obviating sinking of the ordinary bull wheel into soft ground and interfering with the operation of cutting and binding mechanism.

The invention primarily consists in mounting a broad tread roller adjacent to the bull wheel of a binder or harvester and in having said roller normally elevated above the ground surface on which the bull wheel rests and has movement, the roller attachment and the bull wheel having such relative dimensions that when the bull wheel sinks a short distance into soft ground or mud the roller will come in contact with the surface of the ground and, having a broad tread, will prevent sinking of the ground wheel a greater distance into the ground and thus hold the machine up so that the mechanism of the binder or harvester may effectively perform the functions for which it has been devised.

The advantage of the improved attachment is that a harvester or binder may be worked over hard or soft ground with equal efficiency, it being understood that when the bull wheel moves over a hard ground surface the roller attachment will not come into operation or will not engage the ground surface.

The invention further consists in the details of construction and arrangement of the several parts which will be more fully hereinafter described and claimed.

In the drawing: Figure 1 is a top plan view of a portion of a binder shown in full and dotted lines and illustrating the improved attachment in operative position therein. Fig. 2 is a detail side elevation of a portion of the binder as shown by Fig. 1 and illustrating the relative positions and dimensions of the bull wheel and the improved attachment. Fig. 3 is a rear end elevation of a portion of the mechanism shown by Fig. 1 showing the improved attachment.

The numeral 5 designates the lower frame of a binder or other machine having a tongue 6 attached thereto and suitably braced, as at 7. Held by the inner side of the frame 5 in any preferred and well known manner is a binder platform 8 which is shown in dotted lines; and on the outer side of this platform the usual grain wheel 9 is mounted. On a suitable shaft or axle 10 a bull wheel 11 is carried, said axle terminally engaging bearings 12 secured to the frame 5. This bull wheel 11 is of the usual dimensions and performs the function of a carrying wheel for the portion of the binder with which it is associated. Adjacent to the bull wheel 11 a broad tread roller 13 is mounted on a suitable axle 14 engaging bearings 15 also secured to the frame 5. The roller 13 is of less diameter than the bull wheel and is normally held at an elevation above the ground surface, as clearly shown by Figs. 2 and 3, it being preferred that the lower portion of the roller 13 be about two inches above the ground surface so that when the bull wheel engages soft or muddy ground and sinks thereinto, its depression is limited by the engagement of the broad tread roller 13 with the said soft or muddy surface of the ground.

It will be understood that the proportions of the roller 13 may be varied, but in all constructions it is preferred that the said roller have a very broad tread so as to obviate sinking of the same into soft or muddy ground to any great extent or to set up sufficient resistance to sinking of the bull wheel to such depth as to interfere with the operation of the binder mechanism and especially the cutting apparatus.

The improved attachment is of such simple form that it may be readily applied to binders, harvesters or other machines at a minimum cost.

What is claimed is:

1. The combination with a binder or harvester having the usual bull wheel, of a roller of less diameter but of greater tread width than the bull wheel and rotatable independently of said latter wheel and normally elevated above the ground surface, and an axle independent of and positioned lower than the axle of the bull wheel and upon which said roller is mounted.

2. The combination with a binder or harvester having the usual bull wheel to continually engage the ground surface, of an axle independent of the axle of the bull wheel and mounted at a distance from the latter and free of any connection with the axle of the bull wheel, and a broad tread roller mounted on the axle independent of the axle of the bull wheel at a distance inside the location of said bull wheel, the roller being free to turn on its axle and of less diameter than the bull wheel and normally held above the ground surface.

In testimony whereof I have hereunto set my hand in presence of two subscribing witnesses.

LUTHER R. McDANIEL.

Witnesses:
JIM L. HAMMETT,
S. D. BURCKHARTT.

Copies of this patent may be obtained for five cents each, by addressing the "Commissioner of Patents, Washington, D. C."